United States Patent [19]
Kline

[11] 4,038,185
[45] July 26, 1977

[54] SCUM CONTROL SYSTEM FOR PERIPHERAL FEED CHANNEL OF SEDIMENTATION TANK

[75] Inventor: Kenneth J. Kline, Pewaukee, Wis.

[73] Assignee: Envirex Inc., Waukesha, Wis.

[21] Appl. No.: 721,258

[22] Filed: Sept. 8, 1976

[51] Int. Cl.² .............................................. B01D 21/24
[52] U.S. Cl. ..................... 210/83; 210/519; 210/525
[58] Field of Search ............... 210/83, 84, 519, 520, 210/525, 523

[56] References Cited
U.S. PATENT DOCUMENTS

| | | | |
|---|---|---|---|
| 2,961,099 | 11/1960 | Lind et al. | 210/519 |
| 2,961,100 | 11/1960 | Katz et al. | 210/519 |
| 3,136,724 | 6/1964 | Lind et a. | 210/519 |
| 3,395,800 | 8/1968 | Kraus et al. | 210/519 X |
| 3,717,257 | 2/1973 | Boyle | 210/525 X |
| 3,770,132 | 11/1973 | Quast et al. | 210/525 |
| 3,794,167 | 2/1974 | Olgann et al. | 210/519 X |
| 3,891,557 | 6/1975 | Engerton | 210/519 |

*Primary Examiner*—John Adee

[57] ABSTRACT

A peripheral feed sewage treatment final clarifier having a channel with lower distribution ports is provided with a vertically adjustable riser which is placed in the port where the scum tends to collect in the channel. The riser is set vertically so that diurnal variations in the elevation of the flow in the channel raises and lowers the collected scum past the upper lip of the riser at which times the scum is removed.

8 Claims, 4 Drawing Figures

U.S. Patent     July 26, 1977     4,038,185
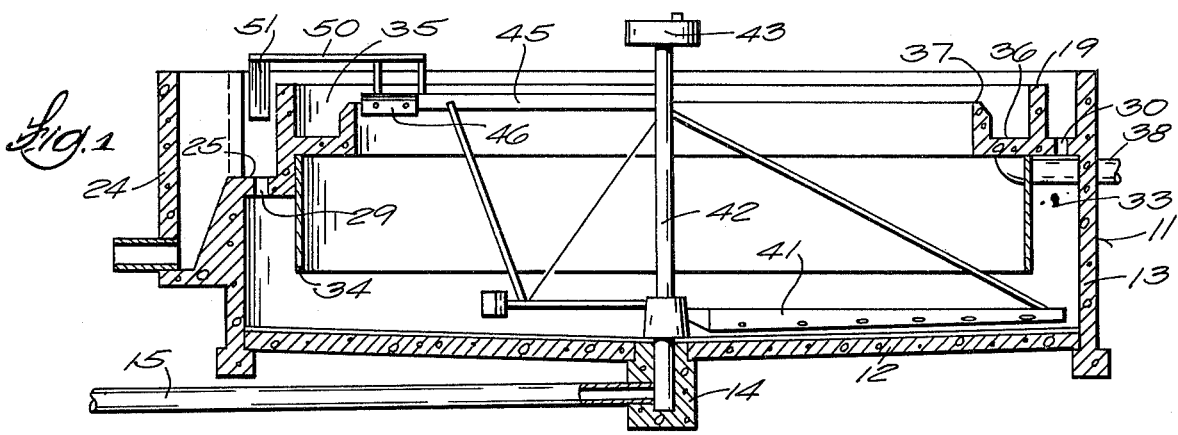
Fig. 1
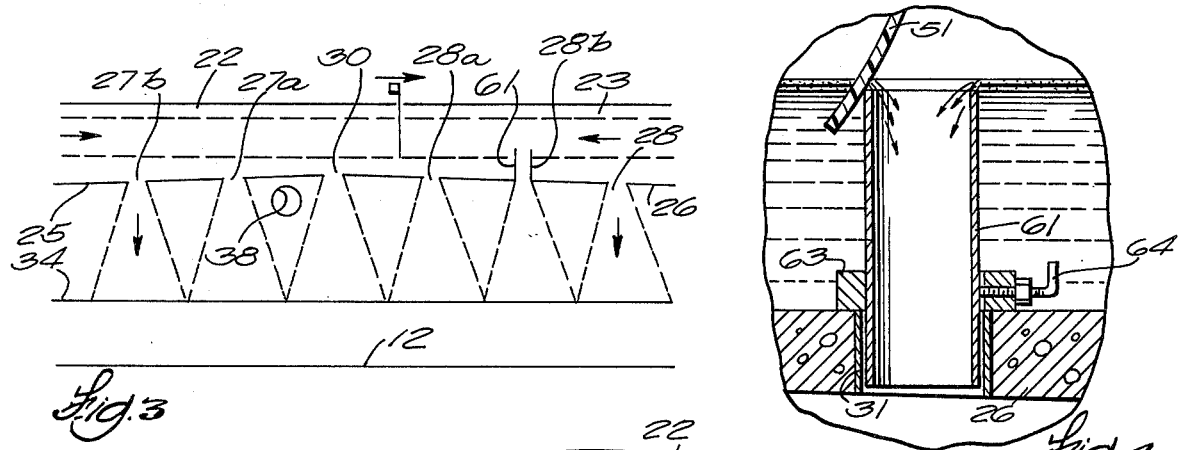
Fig. 3
Fig. 4
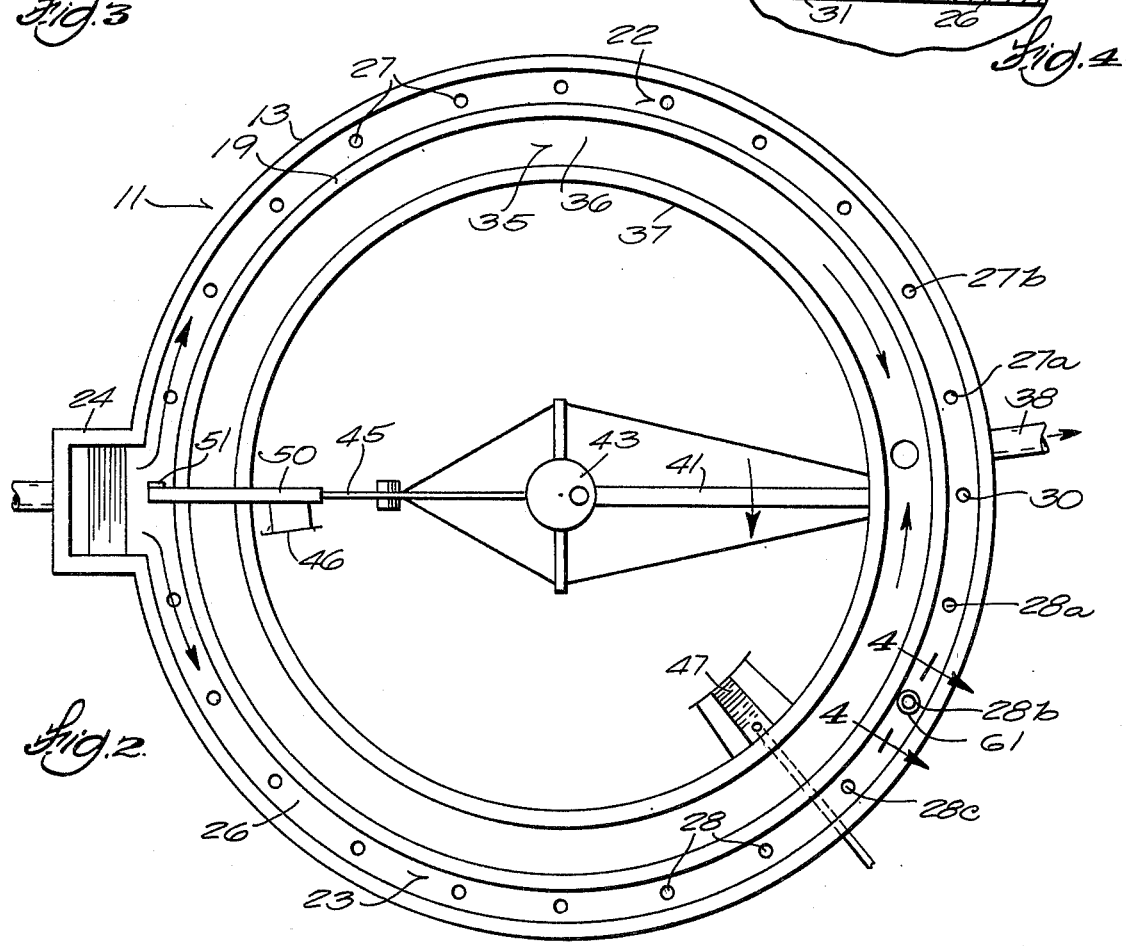
Fig. 2

SCUM CONTROL SYSTEM FOR PERIPHERAL FEED CHANNEL OF SEDIMENTATION TANK

BACKGROUND OF THE INVENTION

The typical wastewater treatment plant includes a final clarifier in which the suspended solids from the prior treatment step is allowed to settle out. These solids generally have very low settling rates which makes the hydraulic efficiency of the tank quite important. Until about 1958, a final clarifier was invariably of the center feed type; since then the advantages of peripheral feed as disclosed in U.S. Pat. Nos. 2,961,099 and 2,961,100 have been demonstrated.

In such tanks, the peripheral feed channel or channels are of diminishing cross-section and can be provided with a series of relatively large ports which are relatively free of clogging. Generally, all of such ports may be of the same size and spaced to provide the equal distribution of the feed around the tank. Where especially large ports are provided, a lower distribution baffle as in U.S. Pat. No. 3,228,530 may also be provided.

In recent years the waste in some treatment plants has included grease solids which are not always entirely removed by the prior treatment step; this has made it necessary to provide for skimming of the tank and the peripheral feed channel.

U.S. Pat. No. 3,136,724 shows manually operable gates for the selective removal and disposal of the scum which has collected at the ends of the peripheral feed channels. The object of the present invention is to provide dependable and readily adjustable means for removing the accumulated scum from the feed channel but which does not require manual attention or an automatic timing and operating mechanism. The invention is based upon the regular, daily variation in the flow through the usual sewage treatment plant and the observation that as the flow increases, somewhat more grease passes through the plant untreated and the accumulation continues to about the time the flow rate diminishes towards its low day - or night-time rate.

BRIEF SUMMARY OF THE INVENTION

At critical flows, scum tends to collect in the terminal portions of the open peripheral feed channel of the final clarifier in an activated sewage treatment system. The channel has a series of lower ports of uniform size; a vertically adjustable riser is placed in the selected port where such scum tends to collect and provides for scum withdrawal as the diurnal fluctuations in the elevation of the flow passes a critical elevation which is about one quarter of an inch above the lip of the riser. The scum is not directly removed from the tank but is rejoined with the flow into the tank and is removed by the surface skimming apparatus within the tank. At high flow rates the riser allows the normal flow through the port; at lower flow rates the port is closed without any adverse effect.

BRIEF DESCRIPTION OF THE SEVERAL VIEWS OF THE DRAWINGS

FIG. 1 is a vertical cross section of a concrete tank having a peripheral feed channel.

FIG. 2 is a plan view of the tank shown in FIG. 1.

FIG. 3 is a profile of the terminal portions of the two feed channels of the tank.

FIG. 4 is a section taken on line 4—4 of FIG. 2.

DESCRIPTION OF THE PREFERRED EMBODIMENT SHOWN IN THE DRAWINGS

The sedimentation tank 11 or clarifier shown in the drawings is of concrete construction and includes the floor 12 and circular sidewall 13. Floor 12 slopes downwardly to the central sludge receiving sump 14 to which the sludge withdrawal pipe 15 is connected. The feed channels and effluent trough or launder as shown are also of concrete construction and integral with sidewall 13.

The upper part of sidewall 13 and the concentric inner wall 19 define the sides of the left and right feed channels 22 and 23. Said feed channels extend in opposite directions around the tank 11 from the inlet or feed box 24 and their floors 25 and 26, respectively, slope upwardly from feed box 24 to their adjoining ends. Each floor 25 and 26 is provided with a series of ports 27 and 28 through which the feed passes into the upper end of a relatively large annular distribution chamber which extends fully around tank 11. As shown, there is also a first port 29 at the feed box 24 and an opposite port 30 at the adjoining shallow ends of channels 22 and 23. In practice, a minimum depth of the feed channels 22 and 23 may be required to prevent vortexing, as will be mentioned again. For that purpose the terminal portions of channel floors 25 and 26 may be flat while their major portions slope upwardly from feed box 24.

In the construction of tank 11, the ports 27-30 are defined by steel liners such as liner 31 shown in FIG. 4 and which are left in place. The distribution chamber 33 referred to is defined by the undersides of channel floors 25 and 26, the annular skirt 34 extending downwardly therefrom, and the tank sidewall 13.

The feed passes below skirt 34 to enter the tank and flows toward the center over the tank floor 12. The clarified flow then moves upwardly and toward the peripheral overflow launder 35 which is formed by the inner wall 19 of channels 22 and 23, the floor 36 projecting therefrom and the weirwall 37. The effluent pipe 38 from launder 35 extends through skirt 34 and sidewall 13 of tank 11.

Various means for moving the settled sludge to sump 14 may be provided. In the drawings an eductor 41 is shown; it is supported and moved over floor 12 by the drive column 42 and the upper drive mechanism 43 which may be mounted on a central pier, not shown, or supported by a bridge, not shown.

As shown in FIGS. 1 and 2, drive column 42 also supports attling tank.

The upper extension arm 50 is supported from blade 45 and extends over the channels 22 and 23 as the arm is rotated by the column. Arm 50 carries the flexible pusher or blade 51 which extends downwardly between sidewall 13 and inner wall 19. Such a pusher is shown in FIG. 5 of U.S. Pat. No. 3,717,257. Its operation in connection with the present invention will be described hereinafter.

In the operation of tank 11, the feed from pipe 50 enters the feed box 24 and flows into the two channels 22 and 23. It is important to note a) that the elevation of the surface of the liquid in the tank varies only from a fraction of an inch above the weir of wall 36 at low flows and for example only up to two inches above the weir at the maximum, or design flow of the tank and b) that the headloss through the ports 27 - 30 is with reference to whatever that elevation is. In a typical installation, for example here, the headloss through ports 27 –

30 varies from ¼ inch (6.35 mm) at low flows to 7 inches (17.78 cm). On the other hand, the headloss required for the flow to the last ports at the ends of the channels may be considered nominal. In the typical installation, the ports 27 – 30 may be of a 4 inch (10.16 cm) diameter and the minimum depth of channels 22 and 23 would be about 4 inches so that vortexing is precluded.

In a typical municipal sewage treatment plant, at low flows the grease content of the raw sewage entering the sewage treatment plant is relatively low; as the flow increases due to laundry and industrial activity, the grease content increases and at a near to maximum flow, some of the grease passes through the preceding treatment step and is carried into the tank. The amount of such grease is usually such as to require regular or daily skimming of the tank as with the apparatus described. In general, most of the grease is carried through ports 27 – 30 but the fraction which rises to the top of the flows in channels 22 and 23 is carried toward port 30 where it collects until it extends over some number of the ports and must eventually be removed. To a degree, the flexible blade 51 pushes the scum downwardly so that it is passed into the tank, and particularly through the ports 28 of channel 23 in which the blade moves against the flow in the channel.

According to the present invention, the vertically adjustable pipe or riser 61 may be set in port 30 or the last port 28a of channel 23 where by observation it is determined that scum tends to collect between passes of blade 51. As shown in FIGS. 2–4, the riser 61 is set in the second last port 28b of channel 23. The upper lip of riser 61 also is set at an elevation intermediate the minimum and maximum elevations of the flow in the channels and more particularly as will be described. At low flows when the elevation is below the lip of riser 61, there is of course, no flow through port 28b but this is of no general consequence as to the hydraulic efficiency of the tank.

As the flow through the plant increases during the day, at some point, the channel flow reaches and slowly passes the lip of riser 61. During that period, the flow through port 28b is drawn from the surface of the flow and would include whatever grease is present. During the day as the flow rate continues to increase and decrease again, the port 28b is essentially operative as it would be without the riser pipe. That is, the surface of the feed in the channels is well above riser 61 and the flow through riser 61 and port 28b is drawn from the body of the liquid. It is during this period that the scum begins to collect in greatest quantity. As the elevation in channel 23 approaches again the lip of riser 61, this grease flows into the riser and into tank 11 from where it is thereafter removed, as described.

The riser 61 may comprise merely a length of pipe as shown which fits within the selected port. As shown in FIG. 4, port 28b is defined by the steel liner which is set in the concrete of floor 23 and the lower end of riser 61 fits therein and is held upright thereby. The collar 63 on riser 61 includes the set screw 64 which allows the collar to be secured on the riser where desired. When set in place, collar 63 rests on floor 26 to support the riser vertically.

As mentioned according to the present invention, the vertically adjustable pipe or riser 61 may be set in any of various ports. Ordinarily, riser 61 would be set in port 30 which is the last port of the two channels. In some tanks, a single feed channel is provided, as shown for example in FIG. 8 of U.S. Pat. No. 3,717,257. The riser would then be set in the last port of such a channel, assuming here that the pusher or blade 51, if provided, pushes in the direction of the flow.

Assuming, with reference to FIG. 4 disclosing the present invention, that blade 51 moves in a clockwise direction, blade 51 pushes the collecting scum from channel 22 some distance into the terminal portion of channel 23 and against the flow in channel 23. Thus, the scum is here most likely to collect over port 28a so that riser 61 is best placed in port 28b as shown so that the scum will be pushed toward the riser. In other instances, riser 61 could be placed in port 28a or in port 28c which is the third last port of channel 23.

The profile of the terminal portions of channels 22 and 23 are shown in FIG. 3. The horizontal upper and lower broken lines respectively indicate the levels of the flow in the channels at maximum and minimum daily flow rates. As described, the riser 61 is vertically adjustable so that its upper lip can be selectively positioned between such upper and lower levels.

As shown, the riser 61 is placed in the second last port of channel 23 but could be placed in another port wherever the grease or scum regularly collects. The broken lines from the ports 27, 28 and 30 indicate only diagrammatically the distribution of the flow from the ports to the lower edge of the skirt 34 of tank 11 where the flow then enters the tank.

Various embodiments of the invention may be employed within the scope of the following claims.

I claim:

1. In a sedimentation tank of the type having a peripheral feed channel provided within a series of lower ports opening into the tank and an effluent weir which maintains a given level of the liquid in the tank such that the level of the feed in the channel varies with the rate of flow in the channel and through the tank, a riser pipe having support means securing the pipe in the channel for discharge through a selected port in the terminal portion of the feed channel where scum collects following a period of lower flow rates, the upper end of the pipe being vertically adjustable to an elevation which corresponds with that of the scum following such periods whereby such scum is periodically removed on a daily basis.

2. In the tank of claim 1, a riser pipe having a lower end which is vertically movable and fits within any of said ports and includes a collar, which is adjustably secured on the pipe and rests on the floor of the channel to support the pipe in the channel with its upper end at the elevation described.

3. In the tank of claim 1, rotary means for pushing the scum in the feed channel toward its terminal portion, said means including a baffle extending between the sidewalls of the channel and extending to below the elevation of the upper end of the riser pipe, said baffle being of the free-hanging type such that it is adapted to swing over and past the riser pipe as required.

4. In the tank of claim 3, a rotary arm having means for the removal of the sediment from the floor of the tank, the rotary means of claim 3 being supported by said rotary arm.

5. A clarification tank of the type having a peripheral feed channel provided with a series of ports opening into the tank and an effluent weir which maintains a given level of the liquid in the tank such that the level of the feed in the channel varies with the rate of flow in the channel and through the tank, means for skimming the liquid content of the tank and the removal of the floating material therefrom, and a riser pipe having support means securing the pipe in the channel for discharge through a selected port in the terminal portion of the feed channel where scum collects following a period of lower flow rates, the upper end of the pipe being set at an elevation which corresponds with that of the scum following such periods whereby such scum is periodically transferred into the tank and thereupon discharged therefrom by said skimming and removal means.

6. The tank of claim 5 wherein the riser pipe has a lower end which fits within any of said ports and includes a collar, and which is adjustably secured on the pipe and rests on the floor of the channel to support the pipe in the channel with its upper end at the elevation described.

7. The tank of claim 5 wherein the skimming means includes a blade for pushing the scum in the feed channel toward its terminal portion and which extends to below the elevation of the upper end of the riser pipe and which is of the free-hanging type such that it is adapted to swing over and past the riser pipe as required.

8. The method of controlling scum collection in the peripheral feed channel of the final clarifier of an activated sludge sewage treatment plant where such channel includes a series of lower ports opening into the tank and the tank includes an overflow effluent launder which maintains a given liquid level within the tank such that the level of the flow in the channel varies with the rate of flow, the collection of the scum generally following periods of low flow such that the collected scum has the same daily elevation, which method comprises the steps of determining the general location of each such daily collection of scum and its elevation and providing withdrawal means in the form of a port opening into the tank from an elevation of about one fourth of an inch below the scum elevation and spaced from the collected scum in the channel a selected distance in the direction of the flow in the channel whereby the collected scum is driven in part toward said port for its removal and discharge into the tank.

* * * * *

UNITED STATES PATENT AND TRADEMARK OFFICE
CERTIFICATE OF CORRECTION

PATENT NO. : 4,038,185
DATED : July 26, 1977
INVENTOR(S) : Kenneth J. Kline

It is certified that error appears in the above-identified patent and that said Letters Patent are hereby corrected as shown below:

Column 2, line 50: after "supports" insert

-- a rigid skimming blade 45 which extends from the column to the pivoted blade 46 which is adapted to operate up and over the scum receiving trough 47 shown only in Figure 2. The operation of skimming blades 45 and 46 and the scum trough 47 is entirely conventional. For reference purposes, U. S. Patent No. 3,770,132 shows such apparatus in another type of -- change "attling" to --settling--

Signed and Sealed this

Twenty-seventh Day of December 1977

[SEAL]

Attest:

RUTH C. MASON
Attesting Officer

LUTRELLE F. PARKER
Acting Commissioner of Patents and Trademarks